United States Patent [19]
Christian et al.

[11] 3,744,741
[45] July 10, 1973

[54] FOLDABLE AIRCRAFT

[75] Inventors: Robert D. Christian, Tustin; Michael F. Steele, Costa Mesa, both of Calif.

[73] Assignee: Celescc Industries, Inc., Costa Mesa, Calif.

[22] Filed: June 8, 1971

[21] Appl. No.: 151,050

[52] U.S. Cl. .................................. 244/16, 244/49
[51] Int. Cl. ............................................. B64c 3/56
[58] Field of Search ................ B64c/31/02; 244/16, 244/34, 38, 49, 138 R, 154, 117 R, 123, 87, 119, 124; 272/31 A; 46/74, 76, 77, 78, 79, 80, 81; 343/705

[56] References Cited
UNITED STATES PATENTS

| | | | |
|---|---|---|---|
| 2,923,241 | 9/1957 | House | 244/34 R |
| 2,979,287 | 4/1961 | Ross | 244/123 |
| 3,327,967 | 6/1967 | Schrantz | 244/1 SS |
| 3,372,893 | 3/1968 | Larsen et al. | 244/138 R |
| 3,473,761 | 10/1969 | Chutter | 244/123 |

OTHER PUBLICATIONS

Haller, George I., "Aircraft Antennas," Proceedings of the I.R.E.; Vol. 30, No. 8, pp. 357–362, 1942.

*Primary Examiner*—Milton Buchler
*Assistant Examiner*—Jesus D. Sotelo
*Attorney*—Tipton D. Jennings

[57] ABSTRACT

A glider or self-propelled aircraft comprising a fuselage, and a pair of flexible and resilient wings secured to the fuselage and normally extending laterally outwardly therefrom. The wings are foldable around the fuselage for storage. A flexible and resilient tail assembly is secured to the fuselage and normally extends rearwardly therefrom. The tail assembly is foldable onto the fuselage and over the folded wings for storage. In operation, the wings and tail assembly are releasably held in folded condition around the fuselage by any suitable means which is released upon deployment of the glider or aircraft to enable the wings and tail assembly to unfold owing to their own resiliency.

11 Claims, 5 Drawing Figures

PATENTED JUL 10 1973　　　　　　　　　　3,744,741

INVENTORS
ROBERT D. CHRISTIAN
MICHAEL F. STEELE

BY　Martha L. Rose
　　　AGENT

FOLDABLE AIRCRAFT

BACKGROUND OF THE INVENTION

This invention relates to a foldable or collapsible glider or self-propelled aircraft and, more particularly, to such a glider or aircraft wherein the wings and tail assembly can be folded around the fuselage for storage. Such gliders or aircraft are useful as aircraft decoys or as target vehicles.

Heretofore, devices which have been utilized as aircraft decoys during air penetration of enemy territory have required the use of parachutes or some other type of drag device to increase their descent time. These devices which have normally carried a suitable electronic payload, have not been completely satisfactory since they have either descended too rapidly or have not flown or floated in a pattern that simulates the attacking aircraft. Thus, the aircraft sensing and locating systems utilized on the ground by the enemy have been able to distinguish the attacking aircraft from the decoy devices.

In the case of target vehicles, where gliders or self-propelled target vehicles have been proposed, these gliders or vehicles have not been foldable or collapsible. Thus, they have required a great deal of storage space on an aircraft, have been carried on the exterior of an aircraft or have been towed by a mother aircraft. In addition, such gliders or aircraft have generally been rather complicated in construction and expensive to manufacture.

Accordingly, a need has arisen for a simple and inexpensive glider or self-propelled aircraft which can be effectively used as an aircraft decoy or as a target vehicle, and which can be stored in a collapsed or folded condition so as to require a minimum amount of storage space and to facilitate launching or deployment.

SUMMARY OF THE INVENTION

The glider or self-propelled aircraft of the present invention is very simple in construction, can be effectively used as an aircraft decoy or target vehicle, and is foldable so that it can be stored in a minimum amount of storage space.

The glider or self-propelled aircraft of the present invention comprises a fuselage, and a pair of flexible and resilient wings secured to the upper surface of the fuselage and normally extending laterally outwardly therefrom. Each of the wings is foldable around the fuselage for storage. A flexible and resilient tail assembly is secured at its forward end to the fuselage and normally extends rearwardly therefrom. The tail assembly is foldable over the fuselage for storage. Each of the wings is curved in transverse cross-section with a concave surface facing downwardly. This curvature of the wings serves to develop lift while providing sufficient bending stiffness to accommodate wing lift loading. The tail assembly is also curved in transverse cross-section with a concave surface facing upwardly. This construction of the wings and the tail assembly facilitates the folding of the wings and tail assembly around the fuselage and also serves to normally resiliently maintain the wings and tail assembly in extended, unfolded positions.

When the glider or self-propelled aircraft of the present invention is to be stored, the wings are folded around the lower and upper surfaces of the fuselage, and the tail section is folded around the upper surface of the fuselage and the folded wings. A strap or any other suitable type of retaining means is wrapped around the folded tail assembly and wings to releasably maintain them in a folded condition. When the aircraft is launched or released from a mother aircraft, the strap or other retaining means is released, and the wings and tail section resiliently open to their unfolded positions wherein they extend outwardly from the fuselage and serve to provide lift for the aircraft.

DESCRIPTION OF THE PREFERRED EMBODIMENTS

Figure 1:
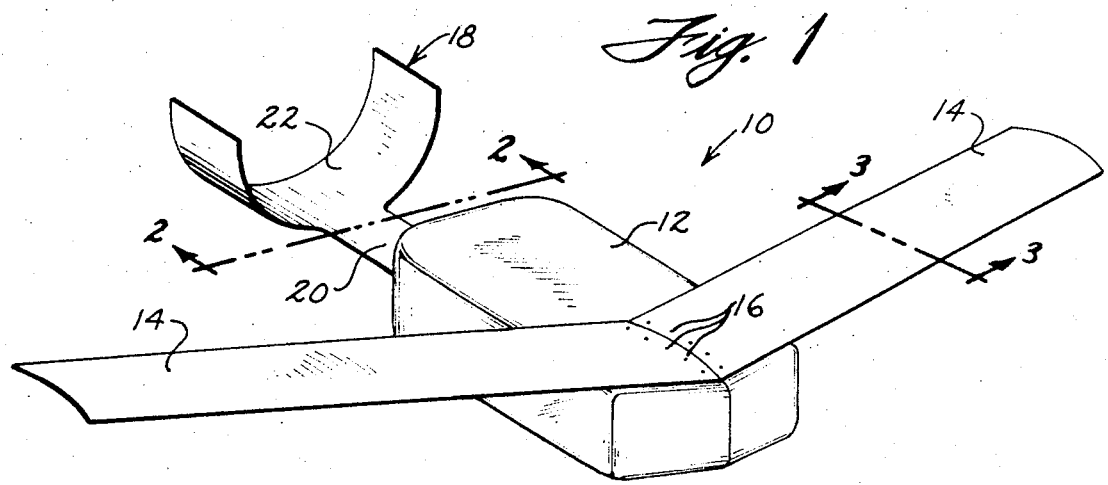
FIG. 1 is a perspective view of a glider or self-propelled aircraft forming in accordnace with the present invention.

As shown in FIG. 1, the glider or self-propelled aircraft 10 of the present invention comprises a fuselage 12 of any suitable construction and formed of any suitable material. The fuselage 12 may support a suitable electronic package (not shown), ballast for maximizing aerodynamic stability (not shown), or a suitable type of propulsion means, such as a rocket motor (not shown), all by way of example.

Figure 3:
FIG. 3 is a sectional view taken substantially along lines 3—3 in FIG. 1.

A pair of wings 14 are secured at their inner ends to the upper surface of the fuselage 12 in any suitable manner, such as by rivets 16 or the like. Each of the wings 14 is formed of a suitable lightweight, flexible and resilient material, such as a light gage spring steel, or any other suitable material. As shown in FIGS. 1 and 3, each of the wings 14 is curved in transverse cross-section with a concave surface facing downwardly so as to help develop lift for the aircraft 10 while providing sufficient bending stiffness to accommodate wing lift loading. The wings 14 are normally resiliently maintained in the position shown in FIG. 1 wherein they extend laterally outwardly from the fuselage 12.

Figure 2:
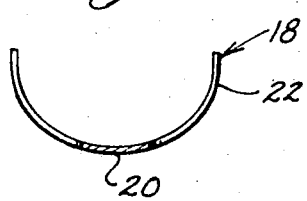
FIG. 2 is a sectional view taken substantially along line 2—2 in FIG. 1.

A tail assembly 18 is secured at its forward end to the lower surface of the fuselage 12 in any suitable manner (not shown). The tail assembly 18 is formed of a suitable lightweight, flexible and resilient material which may be the same as or similar to the material used for the wings 14. Owing to its resiliency, the tail assembly 18 normally extends rearwardly from the fuselage 12 in the manner shown in FIG. 1. The tail assembly 18 comprises a forward narrow body section 20 and a rear tail section 22 that is substantially wider than the body section 20. As shown in FIGS. 1 and 2, both the body section 20 and tail section 22 of the tail assembly 18 are curved in transverse cross-section with a concave surface facing upwardly. Preferably, the tail section 22 is of a width that is at least as large as the width of the fuselage 12 for a purpose to be described hereinafter.

The curvature of the wings 14 and tail assembly 18 serves to resiliently maintain them in the positions shown in FIG. 1 and facilitates the folding of the wings 14 and tail assembly 18 around the fuselage 12 in the manner to be described hereinafter. Preferably, the wings and the tail assembly are stamped or roll-formed using a suitable flexible and resilient material which rejects creep failure and thus will not assume a permanent or semipermanent set when maintained in the folded condition over the temperature range to which the glider or self-propelled aircraft 10 will be exposed. Proper selection of the material for the wings 14 and tail assembly 18 will afford utilization of these components as antennas when used with radiating payloads or the like supported in the fuselage 12. As embodied herein, and as can be seen from the drawings, the wings 14 and tail assembly 18 are not constructed to be inflated. Preferably, these structures are solid in construction as would result from being stamped or roll-formed, as discussed above.

If a suitable type of propulsion means, such as a rocket motor, is mounted in the fuselage 12, the tail assembly 18 will not interfere with the exhaust of the rocket motor owing to the large central opening defined by the curved or U-shaped tail section 22 which is of substantial width.

Figure 4:
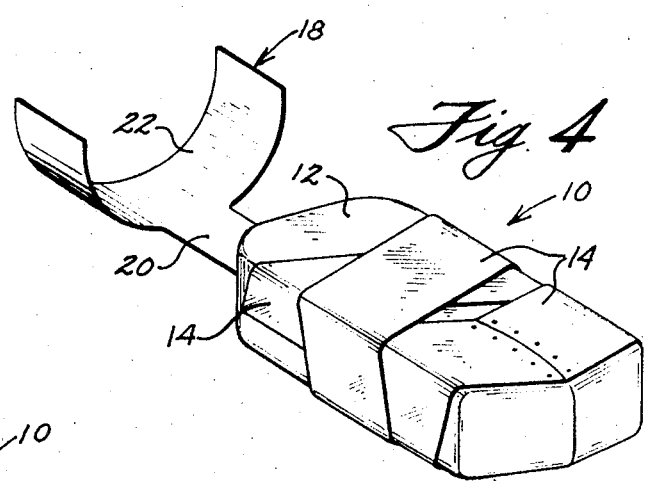
FIG. 4 is a perspective view similar to FIG. 1, showing the wings in a folded position around the fuselage.
Figure 5:
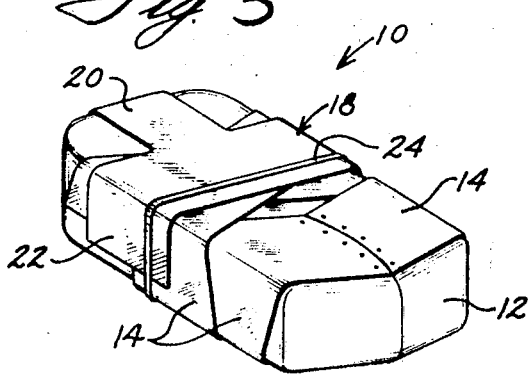
FIG. 5 is a perspective view similar to FIG. 4, showing the wings and tail assembly folded around the fuselage with a retaining strap surrounding the folded wings and tail assembly for releasably retaining them in the folded condition.

When it is desired to store the aircraft 10, the wings 14 are folded around the lower and upper surfaces of the fuselage 12 in the manner shown in FIG. 4, and the tail assembly 18 is thereafter folded upwardly over the upper surface of the fuselage 12 and the folded wings 14 in the manner shown in FIG. 5. A suitable retaining means such as strap 24 may be utilized to releasably retain the wings 14 and tail assembly 18 in the folded condition shown in FIG. 5 until the aircraft is to be launched or released for use as an aircraft decoy or target vehicle. Since the tail section 22 of the tail assembly 18 is of a width that is at least as wide as the fuselage 12, it is easily folded over the fuselage 12 and extends over the sides of the fuselage in the manner shown in FIG. 5.

Within the scope of the present invention, the tail assembly 18 could be folded over the fuselage 12 prior to wrapping the wings 14 around the fuselage, and the wings 14 thereafter could be folded about the fuselage and the folded tail assembly 18. A suitable retaining means, such as the strap 24 shown in FIG. 5, would then be utilized to maintain the tail assembly 18 and wings 14 in a folded condition around the fuselage 12.

Since the wings 14 and tail assembly 18 are foldable about the fuselage to form a package that is approximately the same size as the fuselage, the aircraft 10 may be easily stored in its folded condition and may be stacked in a minimum amount of space within a storage area or an aircraft prior to deployment. When the aircraft 10 is launched or released for use as an aircraft decoy or target vehicle, the retaining strap 24 is severed or released in any suitable manner, either manually or automatically, and the wings 14 and tail assembly 18, owing to their curved cross-section, are immediately resiliently moved to their positions shown in FIG. 1 wherein they extend outwardly from the fuselage 12 and serve to define with the fuselage a glider or self-propelled aircraft that is aerodynamically stable.

From the foregoing description, it will be seen that the aircraft 10 of the present invention may be formed of any suitable lightweight materials, is of very simple construction, will provide a substantial descent time when gliding and will also provide good dispersion characteristics, thereby providing excellent performance as an aircraft decoy or a target vehicle.

What is claimed is:

1. An aircraft, comprising:
 a fuselage,
 a pair of noninflatable, flexible and resilient wings secured to said fuselage and normally extending laterally outwardly therefrom, said wings being foldable around said fuselage for storage,
 each of said wings being curved in transverse cross section with a concave surface facing downwardly, and
 a noninflatable, flexible and resilient tail assembly secured to said fuselage and normally extending rearwardly therefrom, said tail assembly being foldable onto said fuselage for storage.

2. The aircraft of claim 1, whrein said tail assembly is curved in transverse cross-section with a concave surface facing upwardly.

3. The aircraft of claim 2, wherein said tail assembly comprises a narrow body section extending rearwardly from said fuselage, and a tail section that is substantailly wider than said body section, said tail section being of a width sufficient to fit over said fuselage.

4. The aricraft of claim 3, wherein each of said wings is secured at its inner end to the upper surface of said fuselage and is foldable around the upper and lower surfaces of said fuselage.

5. The aricraft of claim 4, wherein said tail assembly is secured at its forward end to the lower surface of said fuselage, and is foldable over the upper surface of said fuselage and over said wings when they are folded around said fuselage.

6. The aircraft of claim 5, further comprising means for releasably holding said wings and said tail assembly in a folded condition relative to said fuselage.

7. An aircraft decoy, comprising:
 a fuselage supporting a payload,
 a pair of noninflatable, flexible and resilient wings secured at their inner ends to the upper surface of said fuselage and normally extending laterally outwardly therefrom, said wings being foldable around the lower surface of said fuselage for storage,
 each of said wings being curved in transverse cross section with a concave surface facing downwardly, and
 a noninflatable, flexible and resilient tail assembly secured at its forward end to the lower surface of said fuselage and normally extending rearwardly therefrom, said tail assembly being foldable over the upper surface of said fuselage and over said wings when they are folded around said fuselage.

8. The aircraft decoy of claim 7, wherein said tail assembly is curved in transverse cross-section with a concave surface facing upwardly.

9. The aircraft decoy of claim 8, wherein a radiating payload is maintained on said fuselage, and said wings serve as antennas for said radiating payload.

10. The aircraft of claim 8 wherein said wings are metallic.

11. The aircraft of claim 5 wherein said wings are metallic.

* * * * *